July 17, 1962  J. E. SINGLEY ET AL  3,044,983
CURED RESINS FROM GLYCIDYL ETHER OF DIHYDROXYDIPHENYLSULFONES
Filed July 22, 1958
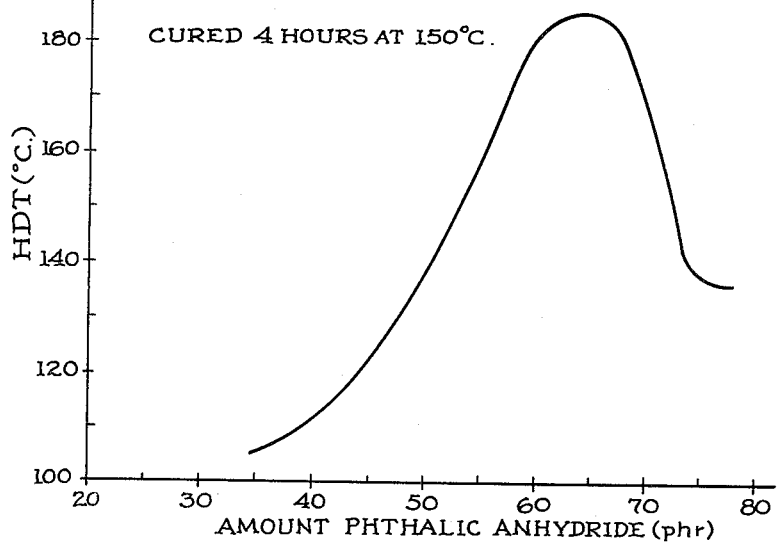
FIG. 1.
FIG. 2.
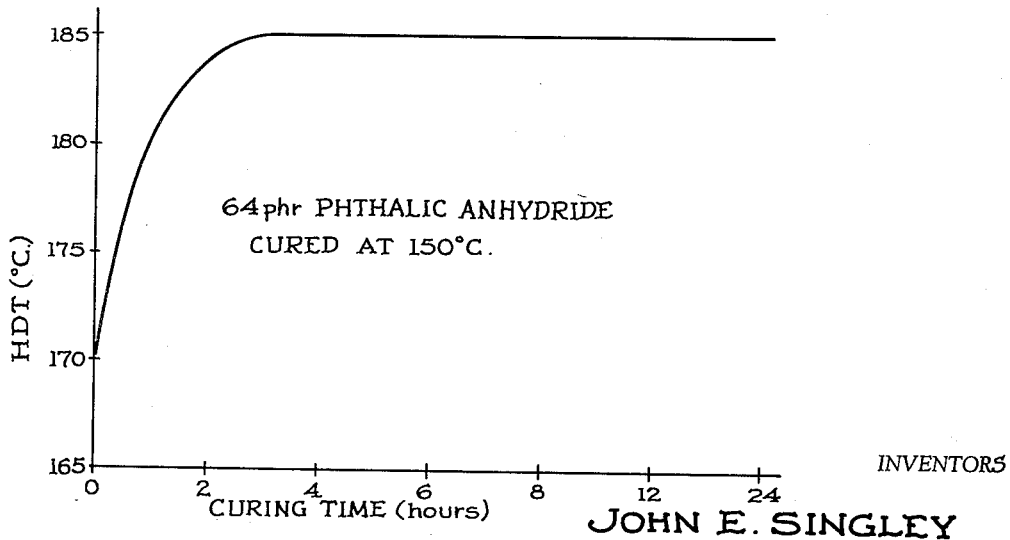
INVENTORS
JOHN E. SINGLEY
ARVID CHRISTIANSEN
BY
Cameron, Kerkam & Sutton
ATTORNEYS

United States Patent Office 3,044,983
Patented July 17, 1962

3,044,983
CURED RESINS FROM GLYCIDYL ETHER OF DIHYDROXYDIPHENYLSULFONES
John E. Singley, Atlanta, and Arvid Christiansen, East Point, Ga., assignors to Tennessee Corporation, New York, N.Y., a corporation of New York
Filed July 22, 1958, Ser. No. 750,227
6 Claims. (Cl. 260—49)

This invention relates generally to the curing of epoxy resin compositions comprising diglycidyl ethers of bisphenols of the type in which the two phenyl radicals are linked to one another by means of a sulfone group and compounds of increasing molecular weight resulting from polymerization of such ethers. More particularly, it relates to resins of the above type that are useful in making castings, and to curing such resins under conditions such as to provide castings having improved properties.

Examples of the resins with which the invention is concerned are the digylcidyl ethers of the various isomeric dihydroxydiphenyl sulfones and related compounds in which additional hydroxyl groups, alkyl groups, halogens or other substituents are attached at one or more positions to one or both phenyl radicals, and products of polymerization thereof. These resinous compositions may be represented by the following formula:

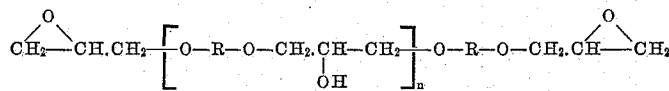

where R is

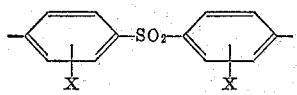

and X is hydroxyl, alkyl, halogen, and the like. When $n=0$, the compound is the digylcidyl ether per se. The value of $n$ increases as polymerization proceeds and molecular weight increases. For purposes of making castings according to the present invention, the value of $n$ should be greater than zero and less than 1.0, being preferably in the range of 0.05 to 0.50.

Epoxy resins similar to those described above, except that the phenyl radicals are linked by hydrocarbon radicals, are well known under various trade names such as "Epon," "Araldite," etc. These resins are condensation products of epichlorohydrin and bisphenol (2,2'-bis (4-hydroxyphenyl) propane. Depending upon the value of $n$, the type of curing agent employed (such as various amines, polycarboxylic acids and anhydrides thereof), and the curing conditions employed, the cured resins vary widely in properties and characteristics and are used in casting, laminating, adhesive, coating and like applications.

For castings such as plastic tools, however, epoxy resins of the "Epon" type fail to provide heat distortion temperatures, compression strengths, and/or like properties as high as desired, even under those curing conditions and with those curing agents (e.g., aromatic amines) which provide the highest heat distortion temperatures obtainable.

It has been found that resins of the type defined by the above formula (i.e., having the sulfone linkage and the prescribed $n$ values) can be used to make castings having superior properties in the above respects. Such resins have a relatively high softening point, however, and the curing agent or agents must be mixed with them at elevated temperatures. The result may be a very vigorous reaction, causing imperfect castings, particularly when aromatic amines are employed as curing agents.

We have also found that phthalic anhydride is an especially advantageous curing agent under the above conditions. In the first place, phthalic anhydride can be mixed with resins of the type in question at temperatures in the neighborhood of 150° C., and then if desired can be cured at temperatures in the range of 150–250° C., without giving rise to overly vigorous reactions and consequent imperfections in the cured castings.

Still further, we have discovered that in the range of about 50–75 phr. (parts of phthalic anhydride per 100 parts by weight of sulfone resin of the prescribed $n$ value), the curve of heat distortion temperature (HDT) plotted against the amount of phthalic anhydride (phr.) goes through a marked optimum, and the HDT values obtained are far superior to those obtainable with other epoxy resins having either the sulfone radical linkage or the hydrocarbon radical linkage. Not only this, but also the aforesaid unexpectedly high HDT values are accompanied by a similar degree of improvement in other desirable properties such as the compression strength of the casting.

A still further unexpected result is that within the preferred range of curing agent, it and the resin can be melted and mixed at around 135° C. and poured into a mold with the development immediately and without further heating of remarkably good HDT. In many cases, therefore, no curing ovens and no sustained application of heat is required because the system cures immediately at room temperature and without externally applied heat.

As typical examples of the member R in the above formula, the following may be mentioned:

(1) 

(2) 

(3) 

(4) Mixtures containing the two isomeric groups (2) and (3)

The resins referred to hereinafter by the arbitrary code designations X–200, Y–200, and Z–200 were of the type shown by the above formula, "R" being respectively of type (1) in the case of X–200, of type (2) in the case of Y–200, and of type (4) in the case of Z–200 (approximately 80% of type (3) and 20% of type (2)). The values of $n$, as determined for a number of samples of these resins, were as follows:

| Resin | $n$ value range |
|---|---|
| X–200 | 0.07–0.490 |
| Y–200 | 0.053–0.450 |
| Z–200 | |

As already stated, the curing agent to be employed according to the present invention is phthalic anhydride in an amount which ranges from about 50 to about 75 parts per 100 parts by weight of the resin. The procedure employed in mixing the reagents is very simple. In a typical example, 200 parts of resin Z–200 are heated to about 150° C. and melted, and the molten resin is then allowed to cool to about 130° C. 142 parts of phthalic anhydride are heated to about 135° C. and melted, and the molten phthalic anhydride is poured into the molten resin. The two are mixed well, during which the mixture may cool to say 110° C. The mixture is then poured into the desired mold, preferably a silicone treated mold, and allowed to set without additional heating, or it may be further cured by means of externally applied heat as set forth below. The same procedure is followed in making castings of other resins such as X–200 and Y–200. The amount of phthalic anhydride to be used is of course determined with regard to the epoxy number of the resin.

The results obtained by the use of the above procedure are illustrated by the accompanying curves in which FIG. 1 is a plot of HDT in ° C. against the amount of phthalic anhydride in phr., and FIG. 2 is a plot of HDT in ° C. against curing time in hours, the resin being Z–200 in both cases.

Referring to FIG. 1, the data from which the curve is plotted were obtained by curing the mixture of resin and phthalic anhydride for four hours at 150° C. It will be observed that there is a marked optimum of HDT values in the neighborhood of 60–65 phr., and that the HDT values are uniformly high (140° C. and above) throughout the range of 50–75 phr. At values of phr. below 50, the curve falls off rapidly. In these lower ranges the mixture is suitable for adhesive applications and the like, but is unsuitable for castings, especially for tooling applications.

FIG. 2, on the other hand, shows the effect on HDT values of variations in curing time. The temperature used in obtaining these data again was 150° C. It will be seen that immediately upon mixing the ingredients and at substantially zero hours curing time, the mixture nevertheless had a quite high heat distortion temperature of 170° C., using the optimum value of 64 phr. (see FIG. 1). Thus it will be seen that the invention in effect makes it possible to eliminate the curing operation and equipment usually required. In other words, a new handling technique for epoxy resins is made possible since a casting having a high HDT is obtained as the result only of the heat content of the reagents themselves, without any externally applied heat or other curing measures and with an ambient temperature that may be ordinary room temperature.

With the aid of further curing, however, still higher HDT values are obtainable as shown by the sharp rise of the curve in FIG. 2 for the first two hours of curing. Thereafter the curve flattens out and no additional improvement in HDT values is obtained with the optimum proportions of curing agent employed even though heating is continued indefinitely.

The curing temperatures employed when the aforesaid additional improvement in HDT is desired should preferably not exceed 250° C., as higher temperatures may cause material degradation in the final casting.

The following table illustrates further results obtained with resins X–200, Y–200, and Z–200 and preferred proportions of phthalic anhydride (PA) under varying curing conditions, in comparison with the results obtained with other epoxy resins cured both with phthalic anhydride and diaminodiphenylmethane (DDM). The epoxy resins employed were those distributed under the trade names "Epon" and "Araldite," and have been described above.

Table I

| Resin | Curing Agent | phr. | Curing Conditions [1] | HDT ° C. |
|---|---|---|---|---|
| X–200 | PA | 68.4 | 2/150 | 188.0 |
| Y–200 | PA | 66.8 | 4/150 | 148.5 |
| Z–200 | PA | 71.0 | 2/250 | 186.5 |
| Z–200 | PA | 71.0 | 24/150 | 180.5 |
| Epon 828 | PA | 74.0 | 22/150 | 120.0 |
| Do | PA | 64.0 | 4/150 | 34.0 |
| Do | PA | 40–50 | 8/149 | [2] 140.0 |
| Araldite 6060 | PA | 64 | 4/150 | 71.0 |
| Araldite 6060 | PA | 30 | 4/150 | 93–109 |
| Z–200 | DDM | 25 | 5/150 | 155 |
| Epon 828 | DDM | 25 | 5/150 | 148 |
| Do | PA | 75 | (2/115) (8/150) | [3] 145 |
| Araldite 6020 | PA | 64 | 4/050 | 132 |
| Do | PA | 49 | 7/150 | [3] 81 |

[1] Curing time in hours, temperature in ° C.
[2] Shell Bulletin 57–16 (April 1957).
[3] Ind. Eng. Chem. 49, 1099 (1957).

It will be observed that the HDT values obtainable with the present invention are very much higher than those obtainable when the other epoxy resins were cured with PA under the same conditions or with DDM under similar conditions, and also very much higher than when resin Z–200 was cured with DDM. These high HDT values are of special importance in the case of castings intended for tooling applications and the like, and as already observed above they are obtained without disadvantage of over-vigorous reaction which often causes imperfect castings.

It will be understood that if desired, resin compositions embodying the present invention may be combined with and cured with other epoxy resins such as Epon, Araldite, and the like. In such cases, of course, the HDT obtained can be expected to lie between the higher value obtainable according to the present invention and the lower value obtainable with the other epoxy resin. This is illustrated in the following table:

Table II

| | Resin | Amount Curing Agent | Curing Conditions | HDT, ° C. | Flexural Strength, p.s.i. |
|---|---|---|---|---|---|
| 1 | Z–200 | 71 | 2/250 | 186.5 | 10,000 |
| 2 | Z–200 | 60 | 6/200 | 194.0 | 8,000 |
| 3 | Z–200 | 71 | 4/150 | 180.0 | 10,000–13,500 |
| 4 | {Z–200 Epon 828} 50/50 | 71 | 4/150 | 149.0 | 17,000 |
| 5 | Epon 828 | [1] 74 | [2] 22/150 | 120.0 | 6,200 |
| 6 | Epon 828 | 64 | 4/150 | 34.0 | 3,280 |
| 7 | Araldite 6020 | 64 | 4/150 | 132 | 15,665 |
| 8 | Araldite 6060 | 64 | 4/150 | 71 | 16,740 |
| 9 | X–200 | 68.4 | 2/150 | 188 | 12,650 |
| 10 | Y–200 | 66.8 | 4/150 | 148.5 | 11,530 |

[1] Stoichiometric amount.
[2] Optimum conditions as determined experimentally.

wherein items 1, 2 and 3, show the results of the present invention in the case of resin Z–200, and item 4 shows the results obtained when resin Z–200 is mixed with an equal amount of Epon 828 and cured under the same conditions as in item 3 of the table. Whereas the average HDT for items 1, 2 and 3 is about 187° C., the HDT for item 4 dropped to 149° C. but was still substantially higher than the HDT of 120° C. obtained in item 5.

As further shown by Table II, the flexural strengths of cured resin compositions embodying the present invention compare favorably with those obtained with other epoxy resins cured under similar conditions. In the case of Epon 828 (items 5 and 6), both HDT and flexural strength are markedly inferior. Araldite samples 7 and 8 showed somewhat higher but comparable flexural strength values. As shown by item 4, the mixture of Epon 828 and Z-200 had flexural strength much greater than either resin alone.

Compression strengths are also of importance for most casting applications and the results obtainable with the present invention are shown by the following table:

Table III

| Resin | Curing Agent | phr. | Curing Conditions | Compression Strength, p.s.i. |
|---|---|---|---|---|
| X-200 | PA | 68.4 | 2/150 | 12,410 |
| Y-200 | PA | 66.8 | 4/150 | 12,580 |
| Z-200 | PA | 64.0 | 2/150 | 23,000 |
| Z-200 | PA | 64.0 | 4/150 | 24,000 |
| Z-200 | PA | 64.0 | 8/150 | 25,000 |
| Epon 828 | MPD [1] | 14.0 | 2/85, 4/150 | 19,000 |
| Araldite 6060 | PA | 30.0 | 4/150 | 15,000 |
| Araldite 6020 | PA | 45.0 | 7/160 | 17,000 |
| Araldite 6060 | PA | 64.0 | 4/150 | 12,470 |
| Araldite 6020 | PA | 64.0 | 4/150 | 12,520 |
| Araldite 6060 | MPD | 6.5 | 4/150 | 14,000 |

[1] Metaphenylenediamine.

Thus it will be seen that within the aforesaid range of $n$ values, and using an amount of phthalic anhydride in in the prescribed range of 50–75 phr. (preferably near the optimum of about 64 phr.), epoxy resins of the diphenyl sulfone type described above can be cured into hard solid castings having superior properties. In particular, these castings are characterized by unusually high heat distortion temperatures, accompanied by quite good flexural and compressive strengths. Such a combination of properties is difficult to find in plastic castings and is especiailly desirable for plastic tooling applications.

Further the process is simple and convenient to operate because curing takes place quickly at relatively low temperatures as indicated by FIG. 2. In fact, as already noted and as shown by FIG. 2, sufficient curing takes place immediately upon mixing the resin and curing agent to provide a heat distortion temperature as high as 170° C., without externally applied heat and heating ovens and like equipment. The curing reaction proceeds rapidly and smoothly at low temperatures, in spite of the relatively high softening point of the resin itself, and perfect castings result in practically all cases.

It is to be expressly understood that the invention is not limited to the foregoing examples or to the details of the foregoing description, and that reference should be had to the appended claims for a definition of its limits.

What is claimed is:

1. A resin composition obtained by mixing together (A) a molten mixture of the reaction product of epichlorohydrin with a dihydroxy-diaryl sulfone having approximately 80% of the structural formula

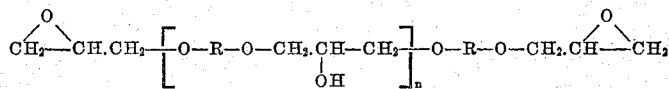

wherein $n$ has an average value in the range from 0.05 to 0.50 and R stands for

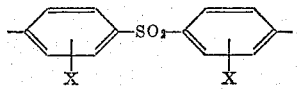

$x$ being a member of the group consisting of hydrogen and methyl groups and having approximately 20% of the structural formula

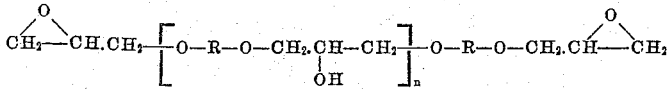

wherein R stands for

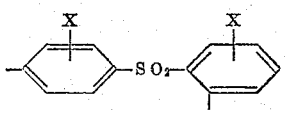

and $n$ and $x$ having the same definition as above and (B) molten phthalic anhydride the amount of which is in the range of 50 to 75 parts by weight per hundred parts by weight of said epoxy containing mixture.

2. A resin composition as defined in claim 1 wherein $x$ is methyl.

3. A resin composition as defined in claim 1 wherein $x$ is hydrogen.

4. The process of making castings characterized by high heat distortion temperatures and compression strengths which comprises melting the mixture defined in claim 1 and placing the mixture in a mold.

5. The proces of claim 4 wherein the melting temperature of the mixture is in the range of about 110° C. to about 150° C. and the mixture is then cured by the exothermic heat of the reaction alone.

6. The process of claim 4 wherein said mixture is additionally cured by heating to a temperature in the range of 150–250° C.

References Cited in the file of this patent
UNITED STATES PATENTS

| | | |
|---|---|---|
| 2,765,322 | Beavers | Oct. 2, 1956 |
| 2,767,157 | Masters | Oct. 16, 1956 |
| 2,773,048 | Formo et al. | Dec. 4, 1956 |
| 2,809,184 | Langer | Oct. 8, 1957 |
| 2,839,495 | Carey | June 17, 1958 |
| 2,853,468 | Steckler | Sept. 23, 1958 |
| 2,890,189 | Greenlee | June 9, 1959 |

OTHER REFERENCES

Lee et al.: Epoxy Resins, Their Synthesis and Characterization, McGraw-Hill (1957), pages 12–16, 30–31, 41, 48–53 and 115–124. (Copy in Sci. Lib.).

UNITED STATES PATENT OFFICE
CERTIFICATE OF CORRECTION

Patent No. 3,044,983                          July 17, 1962

John E. Singley et al.

It is hereby certified that error appears in the above numbered patent requiring correction and that the said Letters Patent should read as corrected below.

Column 4, Table I, fourth column, line 14 thereof, for "4/050" read -- 4/150 --; column 5, line 45, strike out "in"; column 6, line 44, for "proces" read -- process --.

Signed and sealed this 27th day of November 1962.

(SEAL)
Attest:

ESTON G. JOHNSON

Attesting Officer

DAVID L. LADD
Commissioner of Patents